(12) United States Patent
Tsukamoto

(10) Patent No.: US 11,196,280 B2
(45) Date of Patent: Dec. 7, 2021

(54) CHARGE CONTROLLER

(71) Applicant: TOYOTA JIDOSHA KABUSHIKI KAISHA, Toyota (JP)

(72) Inventor: Shota Tsukamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/534,553

(22) Filed: Aug. 7, 2019

(65) Prior Publication Data

US 2020/0076224 A1 Mar. 5, 2020

(30) Foreign Application Priority Data

Aug. 29, 2018 (JP) .............................. JP2018-160703

(51) Int. Cl.
*H02J 7/00* (2006.01)
*H01M 10/625* (2014.01)
*H01M 10/613* (2014.01)

(52) U.S. Cl.
CPC ..... *H02J 7/007192* (2020.01); *H01M 10/613* (2015.04); *H01M 10/625* (2015.04)

(58) Field of Classification Search
CPC .. H02J 7/007192; H02J 7/0029; H02J 7/0042; H01M 10/625; H01M 10/613; H01M 2220/20; H01M 10/6568; H01M 10/443; Y02E 60/10; Y02T 90/12; Y02T 10/7072; Y02T 90/14; Y02T 10/70; B60L 53/00; B60L 53/302; B60L 58/26; B60L 53/60
See application file for complete search history.

(56) References Cited

U.S. PATENT DOCUMENTS 9,786,961 B2 * 10/2017 Dyer ........................ B60L 58/26
2017/0361722 A1 * 12/2017 Kohler ..................... B60L 53/31
2019/0308519 A1 * 10/2019 Tsukamoto ............. B60L 53/16

FOREIGN PATENT DOCUMENTS

JP H10-223263 A 8/1998

* cited by examiner

*Primary Examiner* — Stacy Whitmore
(74) *Attorney, Agent, or Firm* — Sughrue Mion, PLLC

(57) ABSTRACT

A charge controller, which controls a charging process for charging a battery mounted on a vehicle by connecting a charging connector of a charger that is installed outside the vehicle to a charging inlet of the vehicle, includes: a controller discriminating whether a cooling mechanism of the charging connector is provided on a charger side before starting the charging process, operating the cooling mechanism of the charging connector if the cooling mechanism of the charging connector is provided, and operating a cooling mechanism of the charging inlet that is provided on a vehicle side if the cooling mechanism of the charging connector is not provided.

3 Claims, 2 Drawing Sheets

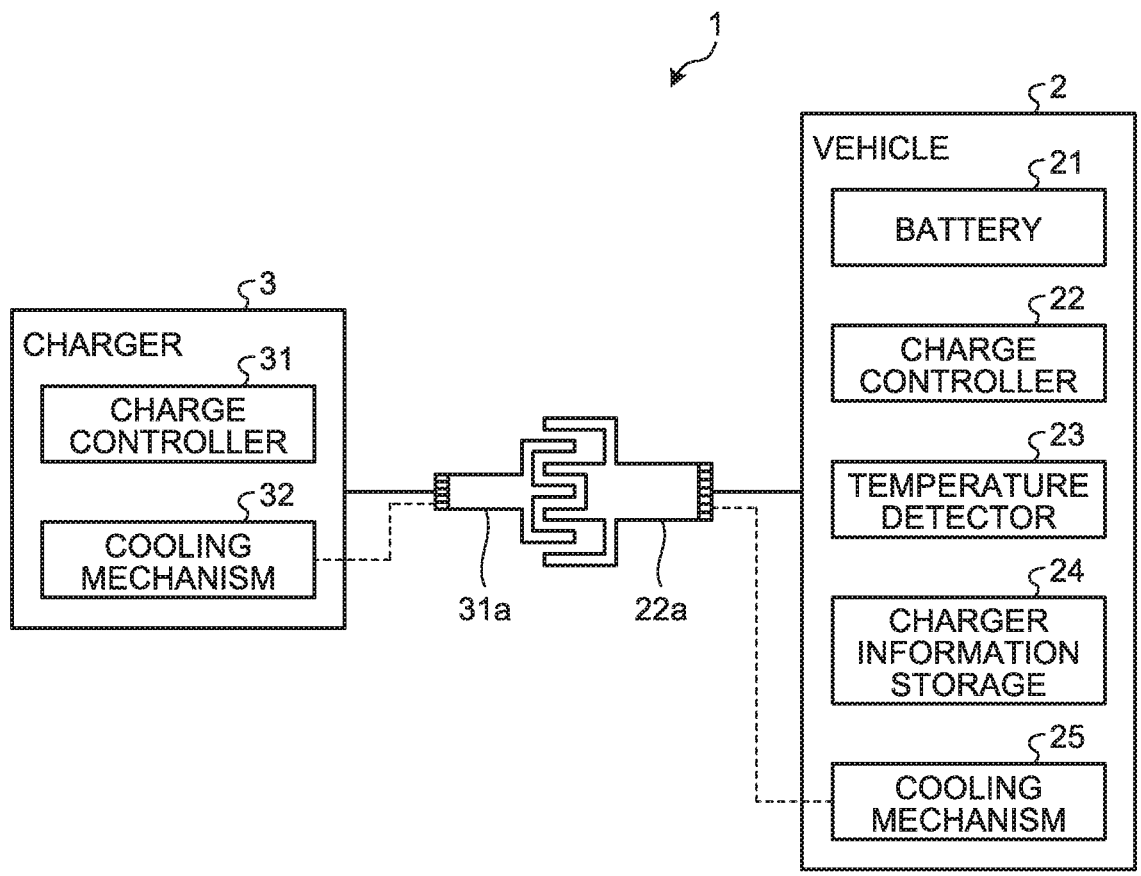

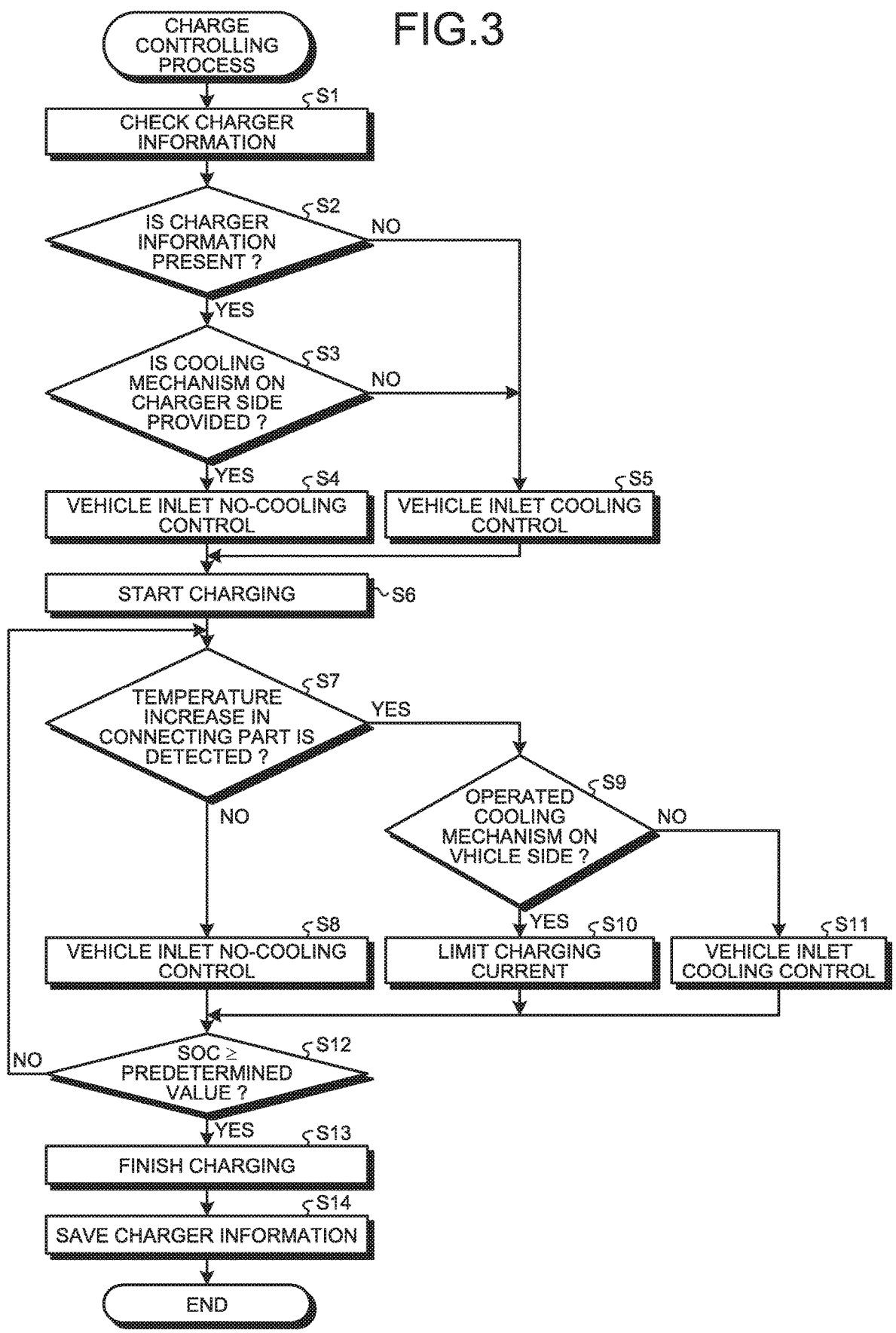

CHARGE CONTROLLER

CROSS-REFERENCE TO RELATED APPLICATION(S)

The present application claims priority to and incorporates by reference the entire contents of Japanese Patent Application No. 2018-160703 filed in Japan on Aug. 29, 2018.

BACKGROUND

The present disclosure relates to a charge controller.

Japanese Laid-open Patent Publication No. H10-223263 discloses a charging method in which a temperature of a secondary battery is controlled by supplying a cooling medium to a secondary battery from a cooling medium source that is provided outside when the secondary battery, which is connected to outside, is charged.

SUMMARY

There is a need for providing a charge controller which can efficiently charge a battery mounted on a vehicle by utilizing a charger that is installed outside the vehicle.

According to an embodiment, a charge controller, which controls a charging process for charging a battery mounted on a vehicle by connecting a charging connector of a charger that is installed outside the vehicle to a charging inlet of the vehicle, includes: a controller discriminating whether a cooling mechanism of the charging connector is provided on a charger side before starting the charging process, operating the cooling mechanism of the charging connector if the cooling mechanism of the charging connector is provided, and operating a cooling mechanism of the charging inlet that is provided on a vehicle side if the cooling mechanism of the charging connector is not provided.

BRIEF DESCRIPTION OF THE DRAWINGS

FIG. 1 is a block diagram illustrating a configuration of a charging system according to an embodiment of the present disclosure;

FIG. 2 is a drawing illustrating an example of charger information; and

FIG. 3 is a flow chart illustrating a charge controlling process according to an embodiment of the present disclosure.

DETAILED DESCRIPTION

In the charging method described in Japanese Laid-open Patent Publication No. H10-223263, an information item indicating whether a cooling mechanism of the secondary battery is provided is not shared by the vehicle side and the power source side, so that the vehicle side and the power source side separately control the temperature of the secondary battery. Therefore, there may be a room for improvement. For example, although it is possible that the secondary battery can be cooled by the cooling medium source that is provided outside, the secondary battery may be cooled by the cooling mechanism of the secondary battery that is mounted on the vehicle side. Due to this, the electric power on the vehicle side during the charge may have to be consumed so that the charging efficiency may be lowered.

Hereinafter, a configuration of a charging system according to an embodiment of the present disclosure and the operations thereof will be described with reference to the accompanied drawings.

Configuration

First, the configuration of the charging system according to an embodiment of the present disclosure will be described with reference to FIGS. 1 and 2. FIG. 1 is a block diagram illustrating a configuration of the charging system according to an embodiment of the present disclosure. FIG. 2 is a drawing illustrating an example of a charger information according to an embodiment of the present invention.

As illustrated in FIG. 1, a charging system 1 according to an embodiment of the present disclosure is a system for charging a battery 21 mounted on a vehicle 2 by connecting to a charging connector 31a of a charger 3, which is installed outside the vehicle 2 such as an Electric Vehicle (EV), a Plug-in Hybrid Vehicle (PHV) and a Fuel Cell Electric Vehicle (FCEV), to a charging inlet (rechargeable battery socket) 22a of the vehicle 2.

In the charging system 1, the battery 21, a charge controller 22, a temperature detector 23, a charger information storage 24 and a cooling mechanism 25 are provided on the vehicle 2 side.

The battery 21 is composed of, for example, a nickel hydrogen battery, a lithium ion battery or the like, and stores high-voltage direct current power for driving the vehicle 2.

The charge controller 22 is an electronic circuit that is mainly composed of a well-known microcomputer including a Central Processing Unit (CPU), a Random Access Memory (RAM), a Read Only Memory (ROM), an input-output interface and the like. The charge controller 22 cooperates with a charge controller 31 that is provided on the charger 3 side to control a charging process for charging the battery 21 by utilizing the charger 3.

The temperature detector 23 includes a temperature sensor that is mounted on the charging inlet 22a. The temperature detector 23 detects an increasing amount dT/dt of a temperature T of the charging inlet 22a per unit time, and outputs the detected electric signal that represents the increasing amount dT/dt of the temperature T of the charging inlet 22a per unit time to the charge controller 22.

The charger information storage 24 stores information relating to the charger 3 which has been used in previous charging processes (charger information). More specifically, as illustrated in FIG. 2, the charger information storage 24 stores a specific identification number assigned to the charger 3 (charger number), an installation location of the charger 3, and information indicating whether a cooling mechanism 32 is provided on the charger 3 side, which are associated each other as the charger information.

Referring back to FIG. 1, the cooling mechanism 25 can be controlled by the charge controller 22 for cooling the charging inlet 22a. As the cooling mechanism 25, an air cooling type heat sink, a water cooling type heat exchanger or the like may be used.

On the charger 3 side, a charge controller 31 and the cooling mechanism 32 are provided. Incidentally, depending on the installation location or a type of the charger 3 (which can be distinguished by its charger number), the cooling mechanism 32 is not sometimes provided.

The charge controller 31 is an electronic circuit that is mainly composed of a microcomputer similar to that of the charge controller 22. The charge controller 31 cooperates with the charge controller 22 to control the charging process for charging the battery 21 via the charging connector 31a and the charging inlet 22a.

The cooling mechanism 32 can be controlled by the charge controller 31 for cooling the charging connector 31a. As the cooling mechanism 32, an air cooling type heat sink, a water cooling type heat exchanger or the like may be used.

In the charging system 1 having the above-described configuration, the charge controller 22 on the vehicle 2 side executes a below-described charge controlling process so as to charge the battery 21 by using the charger 3. Note that the charge controller 31 on the charger 3 side may execute a similar charge controlling process. Hereinafter, an example operation of the charge controller 22 when executing the charge controlling process will be described with reference to a flow chart of FIG. 3.

Charge Controlling Process

FIG. 3 is the flow chart illustrating a flow of the charge controlling process according to an embodiment of the present disclosure. The flow chart illustrated in FIG. 3 starts when the charging connector 31a is connected to the charging inlet 22a, and the charge controlling process proceeds to Step S1. Note that the charge controller 22 may start the charge controlling process when a position information system such as a Global Positioning System (GPS) provided on the vehicle 2 side detects that the vehicle 2 enters a predetermined range from the installation location of the charger 3.

In Step S1, the charge controller 22 checks the presence or absence of the charger information of the charger 3 to which the charging connector 31a is connected. More specifically, the charge controller 22 communicates with the charge controller 31 on the charger 3 side and discriminates whether the charger information of the charger 3, whose installation location is within the predetermined range from a vicinity of a present position of the vehicle 2, is stored in the charger information storage 24, so as to check the presence or absence of the charger information of the charger 3. Thereby, the process of Step S1 is completed, and the charge controlling process proceeds to Step S2.

In Step S2, the charge controller 22 discriminates whether the charger information has been detected in the process of Step S1. As a result of the discrimination, if the charger information has been detected (Step S2: Yes), the charge controller 22 allows the charge controlling process to proceed to Step S3. On the other hand, if the charger information has not been detected (Step S2: No), the charge controller 22 allows the charge controlling process to proceed to Step S5.

In Step S3, the charge controller 22 discriminates whether the charger 3 is provided with the cooling mechanism 32 or not based on the charger information. As a result of the discrimination, if the charger 3 is provided with the cooling mechanism 32 (Step S3: Yes), the charge controller 22 allows the charge controlling process to proceed to Step S4. On the other hand, if the charger 3 is not provided with the cooling mechanism 32, or if the presence or absence of the cooling mechanism 32 cannot be discriminated based on the charger information (Step S3: No), the charge controller 22 allows the charge controlling process to proceed to Step S5.

In Step S4, the charge controller 22 operates the cooling mechanism 32 on the charger 3 side via the charge controller 31. Further, since the charging inlet 22a and the charging connector 31a are contacted with each other and their temperatures are influenced with each other, the charge controller 22 determines that it is not necessary to operate the cooling mechanism 25 on the vehicle 2 side, and restrains the operation of the cooling mechanism 25 on the vehicle 2 side (hereinafter referred to as "vehicle inlet no-cooling control"). Thereby, the process of Step S4 is completed, and the charge controlling process proceeds to Step S6.

In Step S5, the charge controller 22 operates the cooling mechanism 25 on the vehicle 2 side (hereinafter referred to as "vehicle inlet cooling control"). Thereby, the process of Step S5 is completed, and the charge controlling process proceeds to Step S6.

In Step S6, the charge controller 22 cooperates with the charge controller 31 to start the charging process of the battery 21. Thereby, the process of Step S6 is completed, and the charge controlling process proceeds to Step S7.

In Step S7, the charge controller 22 discriminates whether an increasing amount dT/dt of a temperature T of the charging inlet 22a per unit time is less than a predetermined value A based on the electric signal from the temperature detector 23. As a result of the discrimination, if the increasing amount dT/dt of the temperature T of the charging inlet 22a per unit time is less than the predetermined value A (Step S7: No), the charge controller 22 determines that a temperature increase of a connecting part between the charging inlet 22a and the charging connector 31a is not detected, and allows the charge controlling process to proceed to Step S8. On the other hand, if the increasing amount dT/dt of the temperature T of the charging inlet 22a per unit time is equal to or greater than the predetermined value A (Step S7: Yes), the charge controller 22 determines that the temperature increase of the connecting part between the charging inlet 22a and the charging connector 31a is detected, and allows the charge controlling process to proceed to Step S9.

In Step S8, since the charging inlet 22a and the charging connector 31a are contacted with each other, and their temperatures are influenced with each other, the charge controller 22 determines that it is not necessary to operate the cooling mechanism 25 on the vehicle 2 side, and restrains the operation of the cooling mechanism 25 on the vehicle 2 side (vehicle inlet no-cooling control). Note that as a case of, although the vehicle inlet cooling control is started in Step S5, shifting to the vehicle inlet no-cooling control in Step S8, there may be a case that the charger information of the charger 3 is not stored, a case that the cooling mechanism 32 is installed due to renewal of a facility of the charger 3 and the like. Thereby, the process of Step S8 is completed, and the charge controlling process proceeds to Step S12.

In Step S9, the charge controller 22 discriminates whether the cooling mechanism 25 on the vehicle 2 side is being operated. As a result of the discrimination, if the cooling mechanism 25 on the vehicle 2 side is being operated (Step S9: Yes), the charge controller 22 allows the charge controlling process to proceed to Step S10. On the other hand, if the cooling mechanism 25 on the vehicle 2 side is not being operated (Step S9: No), the charge controller 22 allows the charge controlling process to proceed to Step S11.

In Step S10, the charge controller 22 limits a charging current of the battery 21. Thereby, the process of Step S10 is completed, and the charge controlling process proceeds to Step S12.

In Step S11, the charge controller 22 operates the cooling mechanism 25 on the vehicle 2 side (the vehicle inlet cooling control). Thereby, the process of Step S11 is completed, and the charge controlling process proceeds to Step S12.

In the process of Step S12, the charge controller 22 discriminates whether a State Of Charge (SOC) of the battery 21 is equal to or greater than a predetermined value. As a result of the discrimination, if the SOC of the battery 21 is equal to or greater than the predetermined value (Step S12: Yes), the charge controller 22 allows the charge controlling process to proceed to Step S13. On the other hand, if the SOC of the battery 21 is less than the predetermined value (Step S12: No), the charge controller 22 allows the charge controlling process to return to Step S7.

In Step S13, the charge controller 22 finishes the charging process of the battery 21. Thereby, the process of Step S13 is completed, and the charge controlling process proceeds to Step S14.

In Step S14, the charge controller 22 stores the charger information of the charger 3 (the charger number, the installation location and the information on the presence or absence of the cooling mechanism 32 on the charger 3 side) into the charger information storage 24. Thereby, the process of Step S14 is completed, and a series of the charge controlling process ends.

As is clear from the above description, in the charge controlling process according to an embodiment of the present disclosure, before starting the charging process, the charge controller 22 discriminates whether the cooling mechanism 32 of the charging connector 31a is provided. If the cooling mechanism 32 of the charging connector 31a is provided, the charge controller 22 operates the cooling mechanism 32 of the charging connector 31a, and if the cooling mechanism 32 of the charging connector 31a is not provided, the charge controller 22 operates the cooling mechanism 25 of the charging inlet 22a. Thereby, since the cooling mechanism 25 of the charging inlet 22a is not operated more than necessary, and an electric power consumption on the vehicle 2 side can be suppressed, so that the battery 21 can be charged efficiently by utilizing the charger 3.

Further, in the charge controlling process according to an embodiment of the present disclosure, the charge controller 22 discriminates whether the cooling mechanism 32 of the charging connector 31a is normally operated while executing the charging process. If the cooling mechanism 32 of the charging connector 31a is normally operated, the charge controller 22 restrains the operation of the cooling mechanism 25 of the charging inlet 22a, and if the cooling mechanism 32 of the charging connector 31a is not normally operated, the charge controller 22 operates the cooling mechanism 25 of the charging inlet 22a. Thereby, since the cooling mechanism 25 of the charging inlet 22a can be restrained from being operated more than necessary even while executing the charging process, the electric power consumption on the vehicle 2 side can be suppressed.

Moreover, in the charge controlling process according to an embodiment of the present disclosure, the charge controller 22 discriminates whether the cooling mechanism 32 of the charging connector 31a is normally operated based on the changing amount of the temperature of the charging inlet 22a. Thereby, the charge controller 22 can discriminate whether the cooling mechanism 32 of the charging connector 31a is normally operated with high accuracy.

According to the charge controller according to the present disclosure, since the electric power consumption on the vehicle side can be suppressed without operating the cooling mechanism of the charging inlet that is provided on the vehicle side more than necessary, the battery mounted on the vehicle can be charged efficiently by utilizing the charger that is installed outside the vehicle.

According to an embodiment, while executing the charging process, the cooling mechanism of the charging inlet can be restrained from being operated more than necessary. Therefore, the electric power consumption on the vehicle side can be suppressed.

According to an embodiment, it is possible to discriminate whether the cooling mechanism of the charging connector is normally operated with high accuracy.

Although the disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge controller, which controls a charging process for charging a battery mounted on a vehicle by connecting a charging connector of a charger that is installed outside the vehicle to a charging inlet of the vehicle, the charge controller comprising:
a controller configured to discriminate whether a cooling mechanism of the charging connector is provided on a charger side before starting the charging process, operate the cooling mechanism of the charging connector if the cooling mechanism of the charging connector is provided, and operate a cooling mechanism of the charging inlet that is provided on a vehicle side if the cooling mechanism of the charging connector is not provided.

2. The charge controller according to claim 1, wherein the controller is configured to discriminate whether the cooling mechanism of the charging connector is normally operated while executing the charging process, restrain an operation of the cooling mechanism of the charging inlet if the cooling mechanism of the charging connector is normally operated, and operate the cooling mechanism of the charging inlet if the cooling mechanism of the charging connector is not normally operated.

3. The charge controller according to claim 2, wherein the controller is configured to discriminate whether the cooling mechanism of the charging connector is normally operated based on a changing amount of a temperature of the charging inlet.

* * * * *